US012810869B2

(12) United States Patent
Paiuk

(10) Patent No.: US 12,810,869 B2
(45) Date of Patent: Nov. 24, 2026

(54) IDENTIFYING A SPEAKING CONFERENCE PARTICIPANT IN A PHYSICAL SPACE

(71) Applicant: Zoom Communications, Inc., San Jose, CA (US)

(72) Inventor: Alejandro Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 195 days.

(21) Appl. No.: 18/160,066

(22) Filed: Jan. 26, 2023

(65) Prior Publication Data

US 2024/0257816 A1 Aug. 1, 2024

(51) Int. Cl.
*G10L 17/06* (2013.01)
*G06V 40/16* (2022.01)

(52) U.S. Cl.
CPC ............ *G10L 17/06* (2013.01); *G06V 40/172* (2022.01)

(58) Field of Classification Search
None
See application file for complete search history.

(56) References Cited

U.S. PATENT DOCUMENTS 5,483,587 A * 1/1996 Hogan .................... H04M 3/56 379/202.01
8,311,292 B2 11/2012 Tian et al.
8,593,501 B1 11/2013 Kjeldaas
8,819,129 B1 * 8/2014 Cyriac .................. H04L 65/403 709/224
9,613,448 B1 * 4/2017 Margolin ................ G06T 11/60
9,959,014 B2 5/2018 Thelin et al.
10,771,694 B1 * 9/2020 Geng ..................... H04R 3/005
10,867,610 B2 12/2020 Diamant et al.
10,972,655 B1 * 4/2021 Ostap ..................... H04N 7/147
11,165,597 B1 * 11/2021 Matsuguma ........ H04L 12/1822
11,417,343 B2 8/2022 Cohen et al.
11,451,746 B1 9/2022 Graybill et al.
11,935,168 B1 3/2024 Akmal et al.
2002/0023133 A1 2/2002 Kato et al.
2004/0091086 A1 5/2004 Ortel
2004/0095507 A1 5/2004 Bishop et al.
2005/0102502 A1 5/2005 Sagen
2006/0069656 A1 * 3/2006 Horikiri ................... H04N 7/15 348/E7.083
2009/0210491 A1 8/2009 Thakkar et al.
2010/0149305 A1 6/2010 Catchpole et al.
2012/0045093 A1 2/2012 Salminen et al.
(Continued)

*Primary Examiner* — Duc Nguyen
*Assistant Examiner* — Assad Mohammed
(74) *Attorney, Agent, or Firm* — Young Basile Hanlon & MacFarlane, P.C.

(57) ABSTRACT

A conference system is configured to identify a local conference participant who is speaking in a user interface of a remote conference participant. The conference system captures audio data of a conference participant who is speaking in a physical space having at least two conference participants. An identity of the conference participant is determined based on sensor data captured by a sensor device associated with the physical space. The conference system generates an output configured to cause a client application to present a representation of the identity of the conference participant who is speaking concurrently with a presentation of speech audio of the conference participant who is speaking.

20 Claims, 13 Drawing Sheets

(56) References Cited

U.S. PATENT DOCUMENTS

| | | | | |
|---|---|---|---|---|
| 2013/0162752 | A1 | 6/2013 | Herz et al. | |
| 2013/0321123 | A1* | 12/2013 | Wan | G05B 15/02 340/5.2 |
| 2015/0189233 | A1 | 7/2015 | Carpenter et al. | |
| 2016/0284354 | A1 | 9/2016 | Chen et al. | |
| 2018/0342251 | A1 | 11/2018 | Cohen et al. | |
| 2019/0205685 | A1 | 7/2019 | Hara | |
| 2019/0205695 | A1 | 7/2019 | Yan et al. | |
| 2019/0215464 | A1* | 7/2019 | Kumar | H04N 7/08 |
| 2019/0341050 | A1* | 11/2019 | Diamant | G06V 40/172 |
| 2019/0341055 | A1* | 11/2019 | Krupka | G10L 17/08 |
| 2020/0295959 | A1* | 9/2020 | Fukasawa | H04L 12/1818 |
| 2020/0358628 | A1* | 11/2020 | Achyuth | H04M 3/568 |
| 2021/0225380 | A1 | 7/2021 | Wang et al. | |
| 2022/0091810 | A1 | 3/2022 | Warner | |
| 2022/0303314 | A1* | 9/2022 | Wu | H04L 65/403 |
| 2022/0345665 | A1 | 10/2022 | Gronau et al. | |
| 2022/0377177 | A1* | 11/2022 | Tadge | H04N 7/152 |
| 2023/0007060 | A1* | 1/2023 | Matsuura | H04N 1/00209 |
| 2024/0045574 | A1* | 2/2024 | Nagpal | G06F 3/0484 |
| 2024/0064271 | A1 | 2/2024 | Murata | |
| 2024/0154833 | A1* | 5/2024 | Zotto | G06F 40/40 |

* cited by examiner

IDENTIFYING A SPEAKING CONFERENCE PARTICIPANT IN A PHYSICAL SPACE

FIELD

This disclosure relates generally to video conferences including a combination of remote conference participants and local conference participants, and, more specifically, to identifying a local conference participant who is speaking in a user interface of a remote conference participant.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
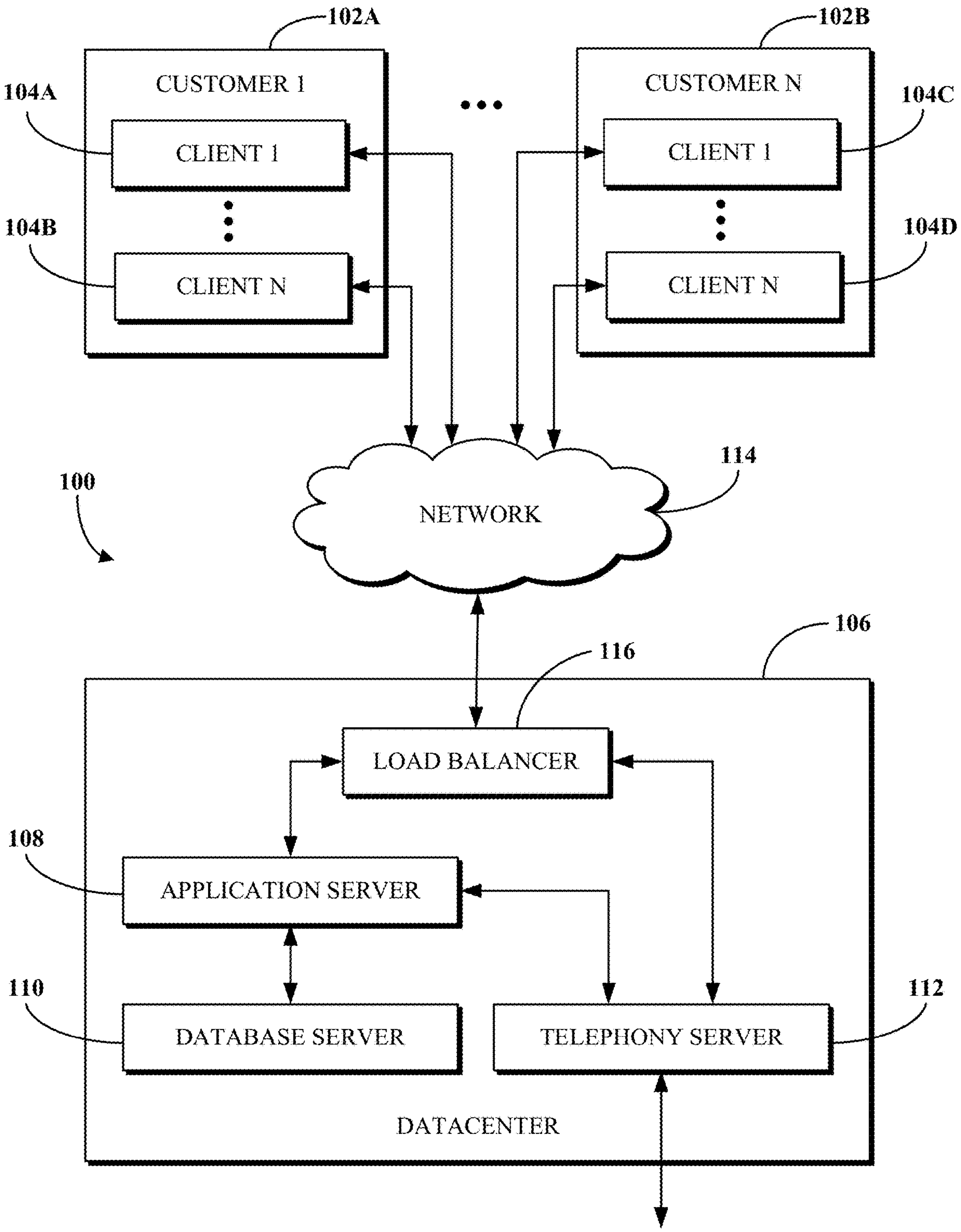
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

One particular example of a communications service, which may be implemented using a UCaaS platform, or otherwise external to such a platform, is a conferencing service that utilizes conferencing software to facilitate audio and/or video conferences between participants. Conventional video conferencing software, such as that implemented by a UCaaS or other software platform, may be used to facilitate a video conference between local conference participants connecting to the conference from a physical space and remote conference participants connecting to the conference from one or more other spaces remote to the physical space. The physical space, such as a conference room, is configured for hosting local participants of the conference and can include video cameras for capturing video of the physical space and microphones for capturing audio in the physical space. The physical space can have multiple video cameras for capturing different viewpoints of the physical space. Similarly, the physical space can be associated with multiple microphones for capturing audio data at multiple locations in the physical space. The local conference participants can move about the physical space such that their location can vary with time.

A conference combining remote conference participants with local conference participants provides remote conference participants the opportunity to attend gatherings without having to be physically present in the physical space. The remote conference participants can interact with the local conference participants and observe activity in the physical space. However, there may be challenges that a remote conference participant experiences because they are attending from a space remote to the physical space in which the local conference participants are physically present. For example, in some instances, a remote conference participant may have difficulty identifying which local conference participant is speaking at a given time. This can result in the remote conference participant having difficulty following along in the conversation or feeling left out of the in person gathering. In another example, in some instances, the remote conference participant may be able to identify which local conference participant is speaking, but not be able to determine their identity. For example, if the remote conference participant is unfamiliar with the local conference participants it may be difficult to put a name to the face of the local conference participant who is speaking. In yet another example, in some instances, a local conference participant who is speaking may not be recognizable in the video presented to the remote user. For example, another local conference participant or an object between the video camera and the speaker in the physical space may obscure the view of the speaking conference participant, the speaking conference participant may have their back to the video camera, or the speaking conference participants may be off screen. In such instances, if the remote conference participant is unable to recognize the voice of the speaking conference participant, they may not know who is speaking in the physical space. These problems are compounded when a single video stream is used for all of the local conference participants rather than each local conference participant having their own video feed given that there may be names associated with individual streams to uniquely identify the individual shown therein, but there is no way to uniquely identify each person shown in a video stream that shows many conference participants.

Implementations of this disclosure address problems such as these using a conference controller that determines the identity of a local conference participant who is speaking and presents a representation of the identity of the local conference participant who is speaking to a client device of a remote conference participant. The conference controller captures audio data, determines an identity of a local conference participant who is speaking based on information captured by a sensor associated with the conference system, and outputs information to cause a client device to display a representation of the identity of the local conference participant concurrent with an output of speech audio of the local conference participant. The representation of the local conference participant can be their name, an alias, an avatar, or other information. The identity of the local conference participant can be determined based on the captured audio data or using other sensors, such as an image sensor for facial recognition. The conference controller can compare the identifying information against existing identifying information to determine the identity of the local conference participant. The conference controller can capture identifying information when a local conference participant checks into the conference and may purge the identifying information immediately after the conference.

The conference controller includes an input/output (I/O) component configured to receive input from input sources and send output to output sources, and a control system component configured to control the operation of the conference system. The input sources include at least an audio sensor for capturing audio data of a physical space and can include other sensors such as image sensors, proximity sensors, and other sensors. The input sources are operable to capture information for identifying conference participants and for determining which conference participant is speaking at any given time. The control system component utilizes the captured information to identify the conference participants and determine which conference participant is speaking. The control system generates information to cause a client application to present a representation of the identity of the conference participant who is speaking concurrently with a presentation of the speech audio of that conference participant. The I/O component sends the information to the client devices for presenting the speech audio concurrent with the presentation of the identity of the conference participant.

To describe some implementations in greater detail, reference is first made to examples of hardware and software structures used to implement a system for identifying speaking conference participants. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
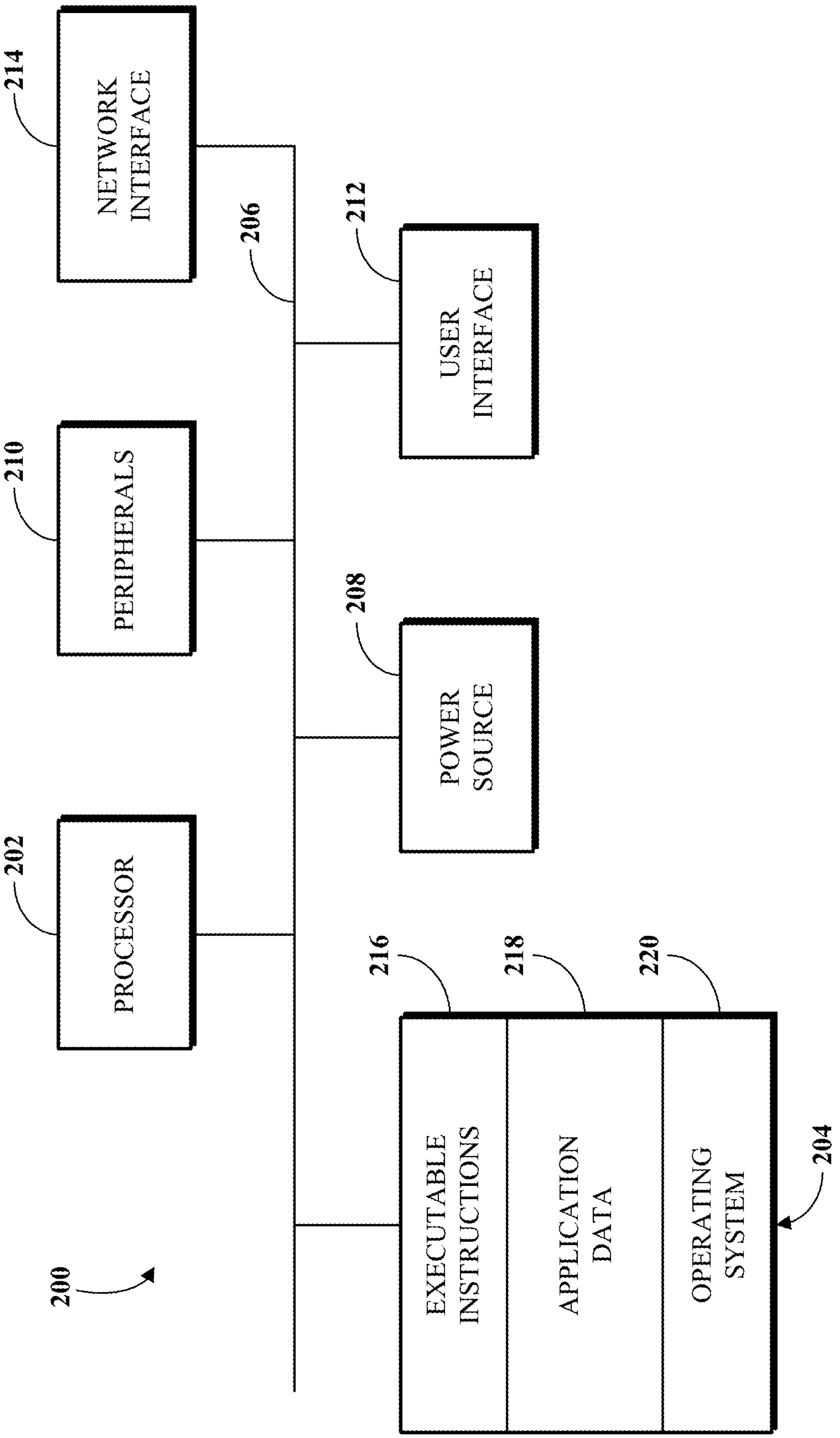
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may for example, be a positional input device, such as a mouse, touchpad, touchscreen, or the like; a keyboard; or another suitable human or machine interface device. An output interface may for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
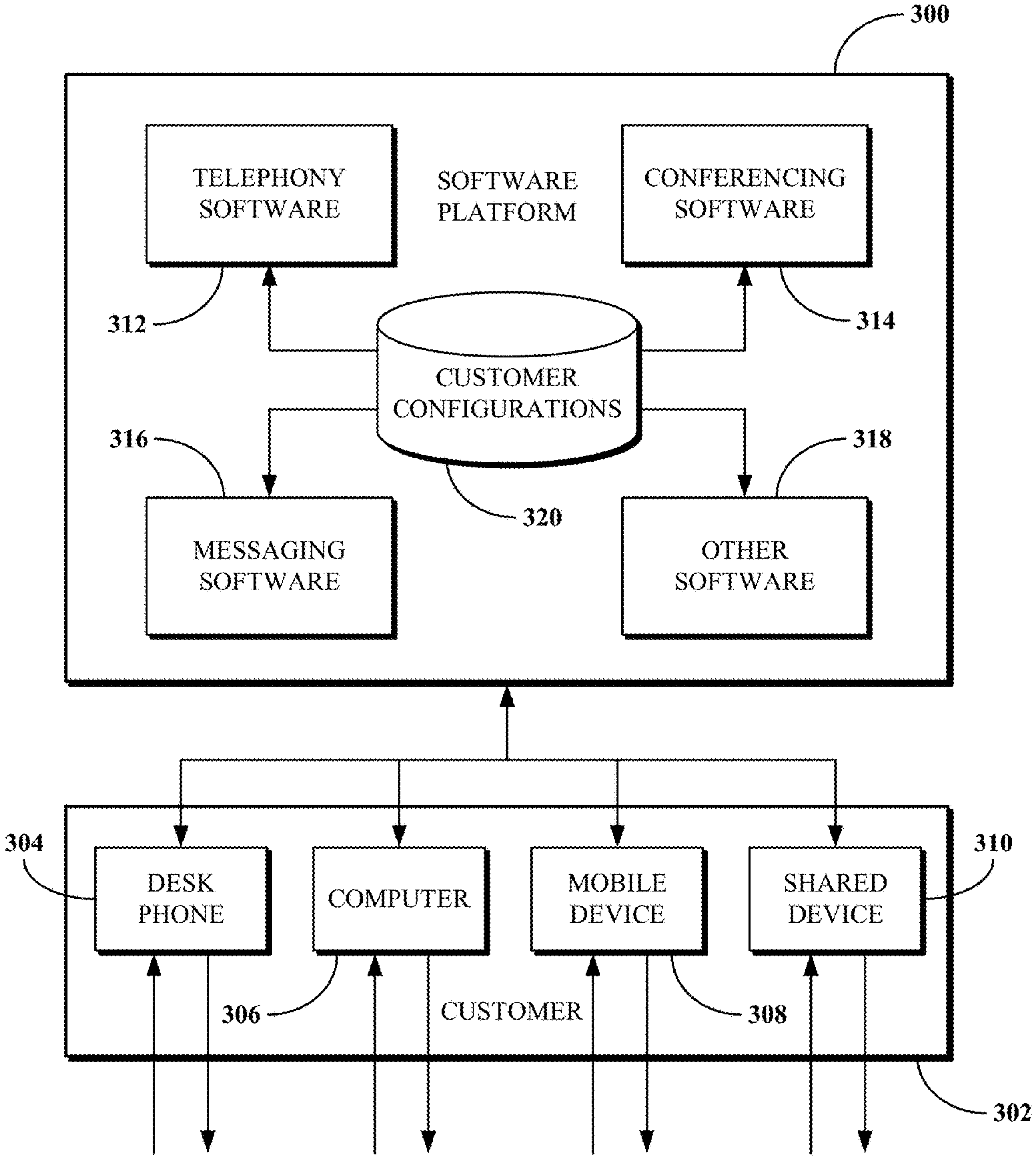
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 utilize customer configurations 320 specific to the customer 302. The customer configurations 320 may for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for determining the identity of a conference participant based on sensor inputs. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
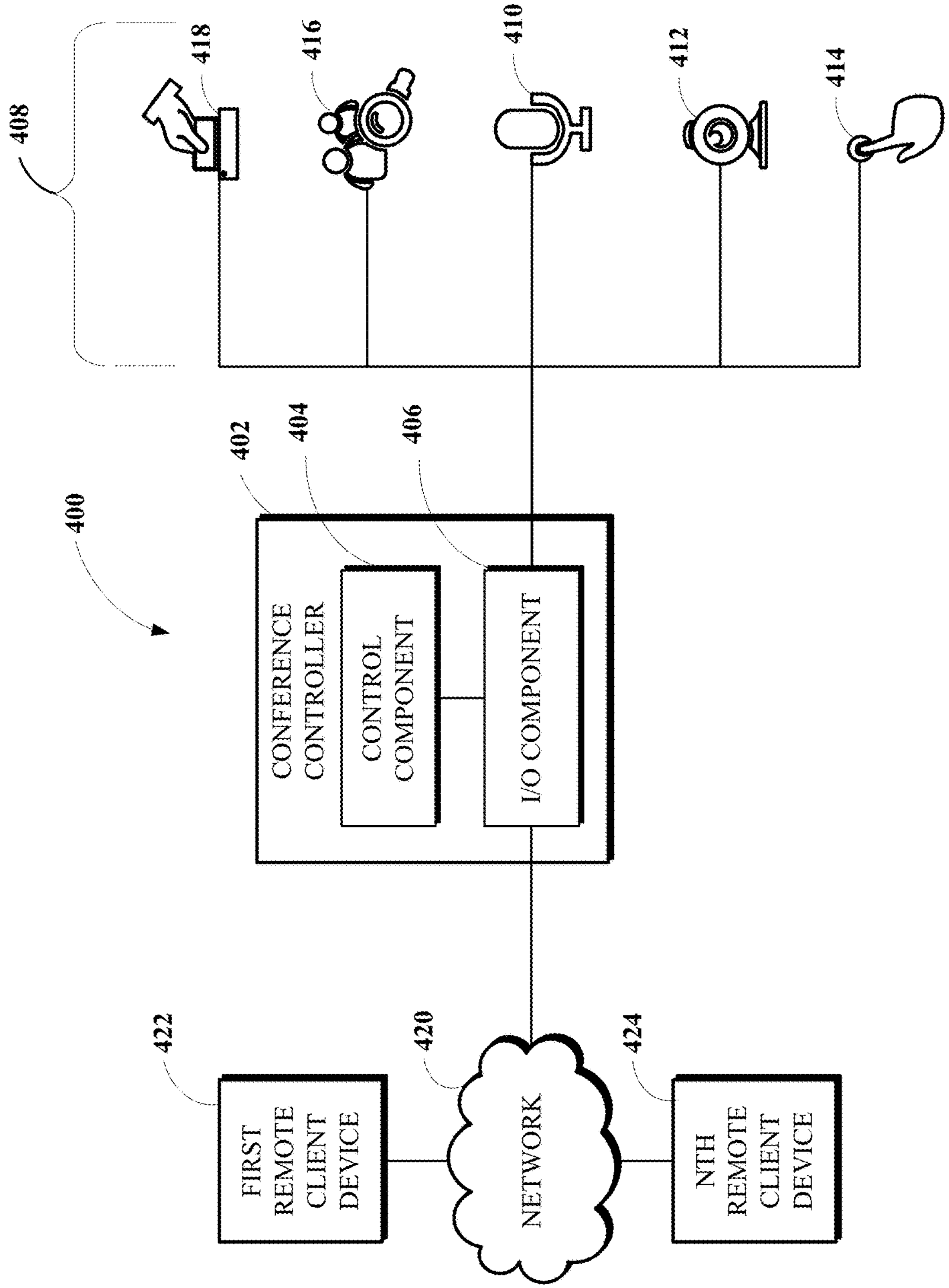
FIG. 4 is a block diagram of an example of a conference system for identifying a local conference participant who is speaking in a user interface of a remote conference participant.

FIG. 4 is a block diagram of an example of a conference system 400 including a conference controller 402 for identifying a local conference participant who is speaking in a physical space. The conference system 400 is used to identify participants to a conference implemented by conferencing software, which may for example, be the conferencing software 314 shown in FIG. 3. As shown, the conference controller 402 includes a control component 404 and an I/O component 406. The conference controller 402 is implemented by a computing device, such as, for example, the computing device 200 of FIG. 2. The conference controller 402 can be located within the physical space. Alternatively, the conference controller 402 may be located external to the physical space, for example, where the conference controller 402 is implemented as a cloud hosted conference controller or otherwise as a remote conference controller. The control component 404 is configured to process data received by the conference controller 402 by way of the I/O component 406. The data received by the conference controller 402 includes sensor data output by sensor devices 408, which may be or otherwise include one or more of an audio sensor such as a microphone 410, an image sensor such as a video camera 412, a fingerprint reader 414, a proximity sensor 416, or a card reader 418. The sensor devices 408 can be located throughout the physical space and at least one of the sensor devices 408 can be located external to the physical space, such as at an entrance to the physical space or adjacent the physical space.

The control component 404 processes the sensor data and produces information that can be sent to output devices through the I/O component 406. The output devices include remote client devices, such as a first remote client device 422 through an Nth remote client device 424 (where N is an integer greater than one) that remote conference participants use to participate in the conference. Thus, the I/O component 406 can include a network controller for communicating with remote client 422 devices 422 through 424. In some cases, the output devices may also include one or more local output devices within the physical space, for example, a video monitor for interacting with the conference controller 402.

The conference controller 402 determines identities of local conference participants within the physical space. In particular, a sensor device 408 can obtain (e.g., receive or detect) sensor input (e.g., audible speech, a fingerprint, or a near field communications or radio frequency chip within a card) and produce sensor data as output to be provided to the conference controller 402. The I/O component 406 of the conference system 400 receives the sensor output from the sensor device 408, and then the control component 404 of the conference controller 402 analyzes the sensor data to determine an identifying characteristic and match the identifying characteristic to known identifying characteristics of conference participants. For example, the identifying characteristics of a conference participant may include an image of the conference participant, a voice print of the conference participant, or a radio frequency identifier (RFID)-enabled badge associated with the conference participant. Based on the matching, the control component 404 associates the sensor data with the identity of a conference participant from whom the sensor input was obtained. For example, where the sensor data includes audio data capturing the speech of a conference participant who is speaking (e.g., in which the sensor data is output by the microphone 410), the control component 404 processes the sensor data to determine the identity of the conference participant who is speaking and associates, based on that processing, at least a portion of the captured audio data with the identity of the conference participant.

In some cases, the conference controller 402 can use the sensor data from multiple sensor devices 408 of the same or a different type to increase the accuracy of determining the identity of the conference participant who is speaking. For example, the conference controller 402 can use multiple microphones 410 to determine a location of the source of speech audio based on differences in amplitude and time delays of captured audio. The conference controller 402 may then verify that the conference participant located at the source of the speech audio matches an identity determined through voice recognition. In another example, the location and identity of each conference participant may be tracked using multiple video cameras 412 and the location of the conference participants may be mapped by the conference controller 402. In response to the conference controller 402 detecting speech audio captured by the microphone 410, the conference controller 402 can determine a source location of the speech using multiple microphones 410 and determine that the conference participant located at a source location is the conference participant who is speaking. In another example, a proximity sensor 416 can be used in combination with other sensor devices 408. For instance, if the source location of the speech audio does not appear to be in view of the video camera 412, a proximity sensor 416 can be used to verify the presence of a conference participant not in view of the video camera 412. Other combinations of sensor data are possible, and implementations are not limited to these particular examples.

In some implementations, the conference system 400 can include an audio to text generation service for generating text from speech audio. The conference controller 402 can provide the identities of the conference participants from whom the speech audio is captured to the audio text generation service to distinguish between names of the conference participants and other words captured in the audio data. Distinguishing between the names of the conference participants can improve the accuracy of the audio to text generation service and provide the names as identifiers in the text to identify the conference participant whose speech was used to generate the text.

The conference controller 402 obtains identifying information representing identifying characteristics of the conference participants that can be used for determining the identity of a conference participant. Identifying information is information that can be used to identify a conference participant using sensor data. For example, identifying information can include image data of the conference participant, biometric data of the conference participant, a voice print of the conference participant, or an identifier assigned to the conference participant such as a bar code, QR code, or beacon. The bar code, QR code, or beacon can be worn by the conference participant as a badge or nametag. The control component 404 uses the identifying information in combination with sensor data to determine the identity of a particular conference participant, such as a conference participant who is speaking. For example, sensor data can be analyzed to determine a match between the sensor data and the identifying information to determine the identity of the conference participant. The manner by which the identifying information is received, the type of identifying information, and the source of the identifying information may vary by use case. In some examples, a conference participant provides the identifying information to the control component 404 when checking into a conference. Checking in to a conference is the process of a conference participant identifying themselves and indicating that they are participating in the conference. For instance, many conferences require participants to check in before entering a conference. The check in may be necessary to verify that the conference participant is permitted to attend the conference, to verify their attendance, and/or to pick up materials for the conference such as a name tag. As part of the check in process, a sensor device 408 near a check in location can capture identifying information that can be used to identify the conference participant at a later time. Alternatively, or in combination with the conference participant providing the identifying information when checking in, in some examples, identifying information is captured ahead of time and stored in a data store. For instance, the conference participant can have a user profile that includes their identifying information. For example, the control component 404 can access the data store after learning the identity of a conference participant, such as by receiving a reservation confirmation including the identities of the conference participants from a calendaring software and retrieve the identifying information corresponding to the conference participants identified in the confirmation. In another example, the control component 404 can access the data store in response to the conference participant checking in to the conference.

The sensor devices 408 capture sensor data that can be used to identify a conference participant, such as a speaking conference participant. Although FIG. 4 illustrates a single sensor device 408 for each type, the physical space associated with the conference can have multiple instances of some or all of the sensor devices 408. For example, the physical space can have a first video camera 412 for capturing identifying information at a check in location and other video cameras distributed through the physical space to later capture sensor data to identify the conference participant. In such instances, a conference participant can check into the conference by identifying themselves, such as by swiping an access badge in a card reader 418 or providing a fingerprint at a fingerprint reader 414. An associated video camera 412 can capture the participant's image for later identification. In some implementations, the conference system 400 can prompt a conference participant to provide a voice sample. In such instances, the microphones 410 transmit data representing the voice sample to the conference controller 402 for later identifying the conference participant's voice.

Remote client devices 422, 424 are connected to the conference controller 402 by way of network 420 and enable remote conference participants to participate in the conference. Each of the remote client devices 422, 424 may, for example, be one of the clients 304 through 310 shown in FIG. 3. The network 420 may, for example, be the network 114 shown in FIG. 1. The remote client devices 422, 424 include instructions for rendering a graphical user interface (GUI) for presenting the conference to the remote participant and audio output devices for outputting audio. The remote conference participants are able to view the conference using the GUI and hear the conference using an audio output device. The remote client devices 422, 424 receive an output from the conference controller 402 over the network 420 for presenting audio of a speaking conference participant and a representation of the identity of the conference participant who is speaking concurrent with the speech of the conference participant.

The conference system 400 generates the output using the control component 404 and the sensor devices 408. The control component 404 receives video data from the video camera 412 and provides related video data to the remote client devices 422, 424 for displaying a video of the conference at the GUI. For example, the related video data can include wide angle views showing the entire conference space and multiple conference participants, narrow angle views showing individual conference participants, and/or medium angle views showing smaller groups of participants. All of the views can be sent to the remote client devices 422, 424, or the conference controller 402 can limit which views are sent. The conference controller 402 or the remote client devices 422, 424 can control the arrangement of views at the remote client devices 422, 424. Additionally, the conference controller 402 receives audio data from the microphone 410 and transmits related audio data to the remote client devices 422, 424 to output. The conference controller 402 may process the audio data to generate the related audio data by performing operations such as combining audio data from multiple microphones 410 and performing signal processing to enhance an audio signal contained in the audio data. The related audio data and the related video data can include timing information to synchronize their feeds at the remote client devices 422, 424. Thus, the remote conference participant is presented with at least one video view of the conference and at least one synchronized audio feed of the conference. The video view may change dynamically based on movement of the local conference participants and the conference controller 402 determining that a participant is speaking. For instance, a narrow video view of the speaking conference participant can be presented at the GUI in response to determining that they are speaking.

At the physical space, the conference controller 402 accesses the identifying information for each conference participant, e.g., retrieves the identifying information for each conference participant invited to the conference or retrieve the identifying information for conference participants as they check in to the conference as described previously, and monitors the sensor data to determine when a local conference participant is speaking. When a determination is made that a local conference participant is speaking, the conference controller 402 determines which conference participant is speaking, determines their identity if it has not already done so, and includes information identifying the speaking conference participant with the related video data and related audio data sent to the remote client devices 422, 424. The information identifying the conference participant can include timing data for associating the identification with a particular time span. The remote client devices 422, 424 can then add the identification of the speaking conference participant, using the techniques described in this disclosure, to the GUI for the time that the conference participant is speaking. The identification can be added to all of the video views, a particular video view, or separate from a video view. For example, the information can be added to a wide angle view of the video conference, to a narrow angle view of the speaking conference participant, to a medium angle view of a group of conference participants including the speaking conference participant, presented as a title to a video view, and/or presented as its own user interface element in the GUI.

The conference controller 402 can store information about the conference, such a meeting minutes, action items, task assignments, meeting artifacts (documents & whiteboard), meeting recordings, highlight reels, and/or transcripts of the speaking conference participants, identification of the conference participants that participated, the location of the conference participants, and whether they were identified using the sensor devices 408. This information can be accessed at a later time for follow-up tasks. For example, contact information for the conference participants can be added to communication distribution lists to receive information, such as the meeting minutes, action items, task assignments, meeting artifacts, meeting recordings, highlight reels, and/or transcripts. In another example, the information can be used for contact tracing using the location and identification of the participants. In another example, the identity of the conference participants can be used to verify individuals that were present during the conference. The verification can be used to confirm decisions or agreements made by conference participants or hold the conference participant accountable for sensitive information shared during the conference. In another example, when a conference includes potential customers, the identity of the conference participants and other information can be loaded into a customer relationship management software for generating subsequent sales leads.

Figure 5:
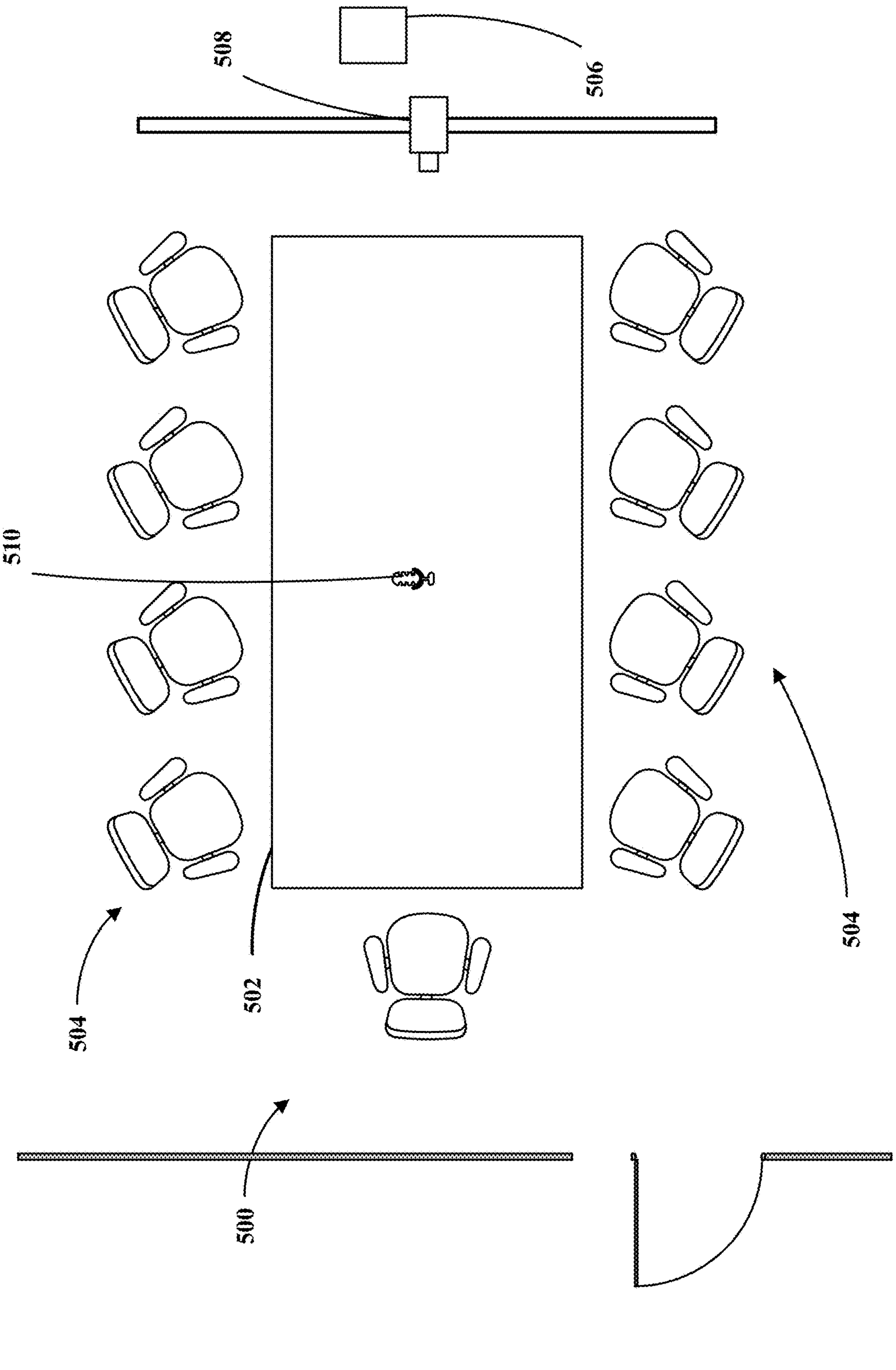
FIG. 5 is a top-down diagram of an example of a physical space for use with a conference system for identifying a local conference participant who is speaking in a user interface of a remote conference participant.

FIG. 5 is an overhead view of an example of a physical space 500 including a conference system for identifying a conference participant who is speaking in the physical space 500. The physical space 500 in the example of FIG. 5 is a small conference room that includes a conference table 502 and chairs 504 for seating conference participants. The conference system includes a conference controller 506, which may for example, be the conference controller 402 shown in FIG. 4, and one or more sensor devices, which may for example, be the sensor devices 408 shown in FIG. 4. As shown, the sensor devices include a video camera 508 and a microphone 510. The video camera 508 can include an integrated microphone for capturing audio in addition to the microphone 510. The video camera 508 and the microphone 510 provide data to the conference controller 506 through data communication links such as wired connections and wireless connections including analog video/audio signals, digital video audio signals, and/or networked communications.

The microphone 510 captures audio in the physical space 500 and transmits audio data representing the captured audio to the conference controller 506. The video camera 508 captures video data in the physical space 500 and transmits data representing the captured video to the conference controller 506. In instances in which the video camera 508 includes an integrated microphone, the video camera 508 can transmit audio data in addition to the video data. During a conference, conference participants may sit in the chairs 504 and the microphone 510 captures audio of a speaking conference participant. The microphone 510 transmits the audio data to the conference controller 506 for processing. Other sensor devices, such as the video camera 508 capture other sensor data for use by the conference controller 506.

The conference controller 506 determines the identity of the conference participant who is speaking based on sensor data captured by one or more of the sensor devices (e.g., the microphone 510 and/or the video camera 508). For example, the conference controller 506 can run or otherwise use voice recognition software operable to analyze the audio data to identify the conference participant who is speaking based on characteristics of their voice. In another example, the conference controller 506 can determine the identity of the conference participant who is speaking based on image data provided by the video camera 508 that shows that the conference participant's mouth is moving, which can indicate that the conference participant is speaking. The conference controller 506 can then analyze the image of the conference participant and use facial recognition to determine their identity.

In some instances, the conference controller 506 may use sensor data captured by multiple sensor devices to determine the identity of the conference participant who is speaking. For example, in addition to recognizing the voice of the speaking conference participant, the conference controller 506 can use the image data to verify that the identity of the speaking conference participant determined using voice recognition matches an identity determined using facial recognition. In another instance, the conference controller 506 can use the placement of the microphones to verify which conference participant is speaking. For example, a conference participant speaking at the end of the table 502 opposing the camera 508 is closer to the microphone 510 than the integrated microphone of the camera 508. Therefore, the audio data captured by the microphone 510 will have a greater audio level than audio data captured by the integrated microphone. Additionally, there may in some cases be a slight signal delay at the integrated microphone compared to the microphone 510 which can be used to estimate the distance between the conference participant and the camera 508. The conference controller 506 can use this information to verify which conference participant is speaking.

The conference controller 506 generates an output configured to cause a client application running at a remote participant device (e.g., one of the remote participant devices 422, 424) to a representation of the identity of the conference participant who is speaking concurrent with the presentation of their speech audio. For instance, the conference controller 506 may generate an audio data stream to send to a remote client devices running a client application for connecting the remote client devices to a video conference, along with metadata indicating which participant is speaking at a particular time in the audio stream. The remote client devices can then output speech audio to a user thereof (i.e., a remote conference participant) and display, in connection with that speech audio, a representation of the speaking conference participant such as a name, an image, an avatar, or other identifier. Thus, the remote participant is aware of which conference participant is speaking even if the remote participant is unable to observe the conference participant who is speaking or if they do not recognize the conference participant's voice.

The conference controller 506 is shown in FIG. 5 as being housed in a single chassis that communicates with each sensor device (e.g., the camera 508 and the microphone 510). In some implementations, however, the conference controller 506 can include distributed components and need not be located in a single chassis. In some implementations, all or a portion of the conference controller 506 may be located remote from the physical space 500 such that the conference controller 506 is not located in the physical space 500.

Figure 6:
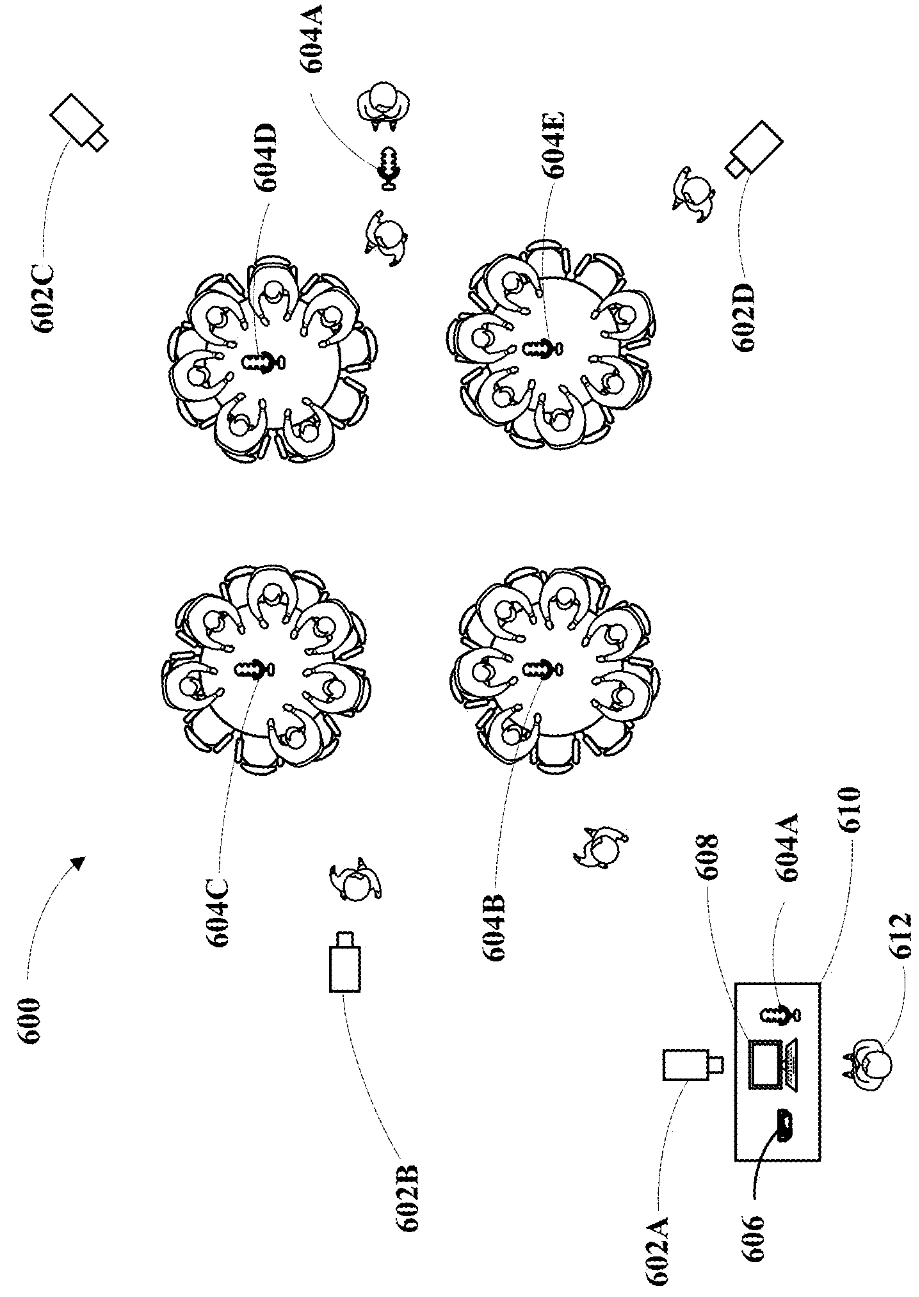
FIG. 6 is a top-down diagram of an example of a physical space for use with a conference system for identifying a local conference participant who is speaking in a user interface of a remote conference participant.

FIG. 6 is an overhead view of an example of a physical space 600 including sensor devices for use with a conference controller to identify a conference participant who is speaking in the physical space 600. The physical space 600 of FIG. 6 includes four video cameras 602A-602D (collectively referred to as video cameras 602), six microphones 604A-604F (collectively referred to as microphones 604), a card reader 606, and a computer terminal 608. The physical space 600 of FIG. 6 may be located in an outdoor environment. For example, the physical space 600 of FIG. 6 may correspond to an outdoor event space. Conference participants are present throughout the physical space 600 with some conference participants sitting at tables and others walking about the physical space 600.

The computer terminal 608, a first video camera 602A, and the card reader 606 are located at a check in table 610 and provide an interface for a conference participant to check into the conference. For instance, in the example of FIG. 6, a first conference participant 612 is standing at the check in table 610 and checking in to the conference. As part of a check in procedure, the first conference participant 612 can provide identification information to the conference system, such as an ID badge at the card reader 606. The card reader 606 sends information that can be used to identify the conference participant, such as authentication information, for authenticating their identity to the conference controller (not shown in this figure) and the conference controller uses the authentication information to verify the identity of the first conference participant 612. In some instances, the first conference participant 612 may provide a name for identifying themselves and no other information. The conference controller can then obtain identifying information for the first conference participant 612, either by accessing existing data stored at a data store accessible by the conference system (e.g., a data store that stores information associated with employees of a company or members of an organization for which the video conference is being implemented), or by capturing identifying information using the first video camera 602A and/or the first microphone 604A. In instances in which there is existing identifying information that the conference controller can access, a sensor, such as the first video camera 602A or the microphone 604A, may be used to authenticate the first conference participant 612. For example, the first video camera 602A may use existing identification data to perform facial recognition of the first conference participant 612 as the first conference participant approaches the check in table 610. In instances in which there is not existing identifying information, the computer terminal 608 may prompt the first conference participant 612 to look into the video camera 602A to generate identifying information and/or may prompt the first conference participant 612 to provide a voice sample to the first microphone 604A. The conference controller can then use the identifying information provided by the first conference participant 612 to identify the first conference participant 612 at a later time when they are speaking.

The video cameras 602 can be used to capture video data that can be used to transmit video data to remote conference participants. Similarly, the microphones 604 can be used to capture audio data that can be used to transmit audio data to the remote conference participants. When a local conference participant speaks, the conference controller attempts to recognize the conference participant who is speaking so that they can be identified at the remote conference participant's client device. The conference controller can recognize the speaking conference participant based on the identifying information either provided at check in or previously stored. For instance, if the identifying information is a voice sample, the conference controller can compare the audio of the speaking conference participant to stored voice profiles to find one that is a match. Or, if the identifying information includes image data, the conference controller can identify which participant is speaking based on image data and match visual characteristics of the participant determined to be speaking with the identifying information of a conference participant.

The sensor devices can be used in combination to increase the accuracy of determining the identity of a conference participant. For instance, the audio data from multiple microphones 604 can be used to determine the general area of the location of the conference participant who is speaking, based on relative audio levels and time delays between when the microphones capture the audio. The conference controller can then narrow the identity of the speaking conference participant to the participants in the general area determined to be the location of the conference participant who is speaking. The identification of the conference participants and their relative location may be tracked using the sensor devices. For example, the various video cameras 602 may use facial recognition and object detection to identify a conference participant and track their location as they move about the physical space 600.

In some instances, a conference participant may speak while located at a location that is not in view of the video cameras 602. In such instances, the conference controller may use voice recognition to identify the speaker. Additionally, the conference controller may increase the confidence that the correct speaker is being identified by limited the available matches to conference participants not appearing on video.

As has been explained, a conference controller, such as the conference controller 402 of FIG. 4 and/or the conference controller 506 of FIG. 5, of a conference system can generate an output configured to cause a client application at a remote client device, such as the remote client device 422 and/or the remote client device 424 of FIG. 4, to present a representation of the identity of the conference participant who is speaking concurrently with a presentation of the speech audio of that conference participant. FIGS. 7-12 are examples of GUIs that can be displayed by at a display of a remote client devices that identify a conference participant who is speaking concurrent with the speech audio. Other formats and GUIs are possible, and the GUI of FIGS. 7-12 are merely example implementations.

Figure 7:
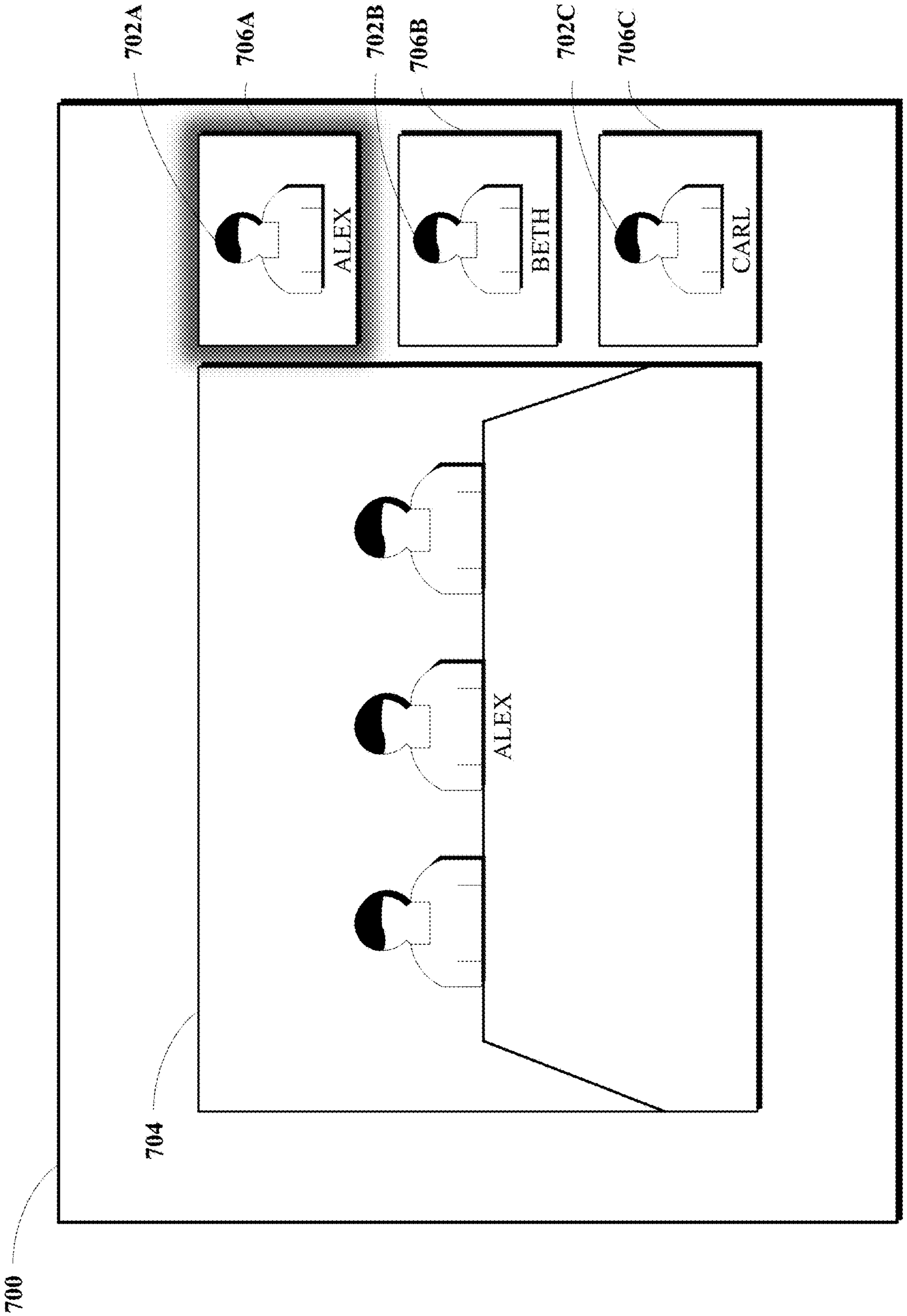
FIGS. 7-12 are illustrations of examples of graphical user interfaces (GUIs) for identifying a local conference participant who is speaking in a user interface of a remote conference participant.

The example GUI 700 of FIG. 7 include three local conference participants, Alex 702A, Beth 702B, and Carl 702C (collectively referred to as local conference participants 702). Their identities in the GUI 700 are represented by text spelling their names. The GUI 700 of FIG. 7 is a simplified version of a GUI and other GUIs can have more local conference participants and the local conference participants may not all be facing a video camera as shown in FIG. 7. The example of FIG. 7 includes a group tile 704 that shows the local conference participants 702 as a group and user tiles 706A-706C (collectively referred to as user tiles 706) that show the local conference participants 702 individually. The user tiles 706 may display a representation of a local conference participant's identity, such as their name, their picture, an avatar, a nickname, or other identifier. In some instances, the user tiles 706 can display a still image corresponding to a stored still image of a corresponding local conference participant. For example, user tile 706A may display a still image of Alex 702A at the time Alex 702A checked into the conference, or, in another example, user tile 706A may display a profile picture of Alex 702A. In other instances, the user tiles 706 can display a live image of the local conference participants 702. For example, user tile 706A may display Alex 702A as he appears in the group tile 704. The user tile 706A may show a cropped version of the group tile 704 such that only Alex 702A is visible.

The example of FIG. 7 further displays the text of the name of the conference participants 702 in the user tiles 706. The name displayed at the user tiles 706 can be retrieved from a profile associated with the identity of the conference participants 702, or the name may be provided by the conference participants 702 when checking into the conference. Thus, a remote conference participant interacting with the GUI can identify each of the local conference participants 702 even if the remote conference participant has not previously met or seen the local conference participants.

The GUI 700 further presents a representation of the identity of the conference participant who is speaking concurrent with an output of speech audio of the conference participant. This may be accomplished using different techniques depending on the implementation of the GUI 700. The GUI 700 of FIG. 7 presents the identity of the conference participant who is speaking in two different ways. First, the GUI 700 displays the text of the name of the conference participant who is speaking in the group tile 704. Second, the GUI 700 highlights the user tile 706 of the conference participant who is currently speaking. For example, in FIG. 7 Alex 702A is currently speaking. The GUI 700 displays the name Alex directly below the image of Alex 702A in the group tile and highlights user tile 706A to indicate that Alex 702A is speaking. User tile 706B displaying an image of Beth 702B and user tile 706C displaying a user image of Carl 702C are not highlighted and the names Beth and Carl do not appear in the group tile 704. When Alex 702A is done speaking, the GUI 700 no longer displays his name in the group tile 704 and the highlighting is removed from his user tile 706A.

Figure 8:
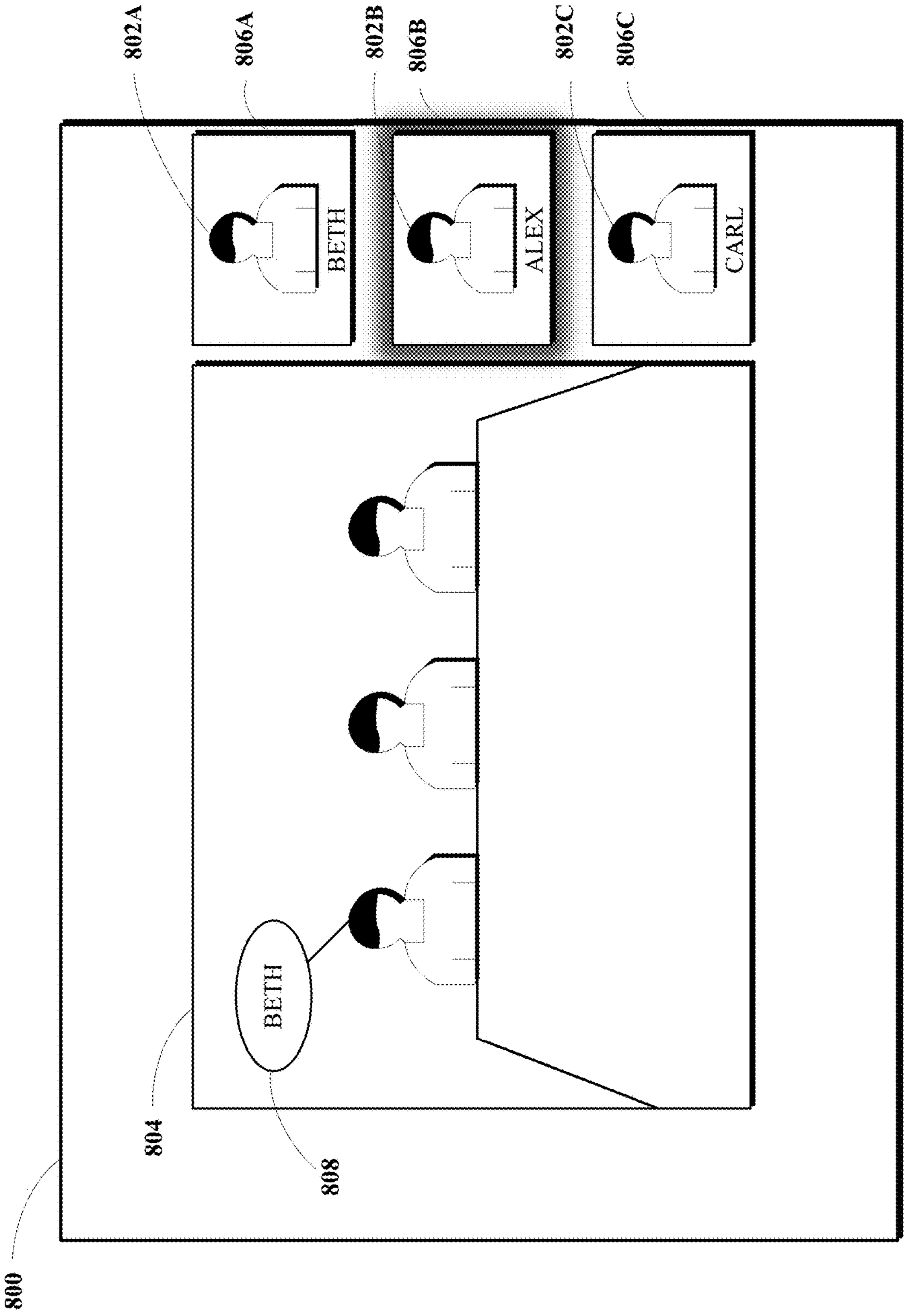

The example GUI 800 of FIG. 8 is similar to the GUI 700 of FIG. 7 in that it includes the three local conference participants, Alex 802A, Beth 802B, and Carl 802C (collectively referred to as local conference participants 802), a group tile 804, and three user tiles 806A-806C. In contrast to the GUI 700 of FIG. 7, the GUI 800 of FIG. 8 presents a representation of the identity of the conference participant who is speaking using a callout 808 in addition to highlighting the respective user tile. For example, in FIG. 8, Beth 802B is now speaking instead of Alex 802A. The user tile 806A associated with Alex 802A is no longer highlighted as was shown in FIG. 7 and the user tile 806B associated with Beth 802B is now highlighted. In addition, the callout 808 presents Beth's name along with a lead line connecting the callout to Beth 802B in the group tile 804. Thus, a remote conference participant interacting with the GUI 800 can determine that Beth 802B is currently speaking.

Figure 9:
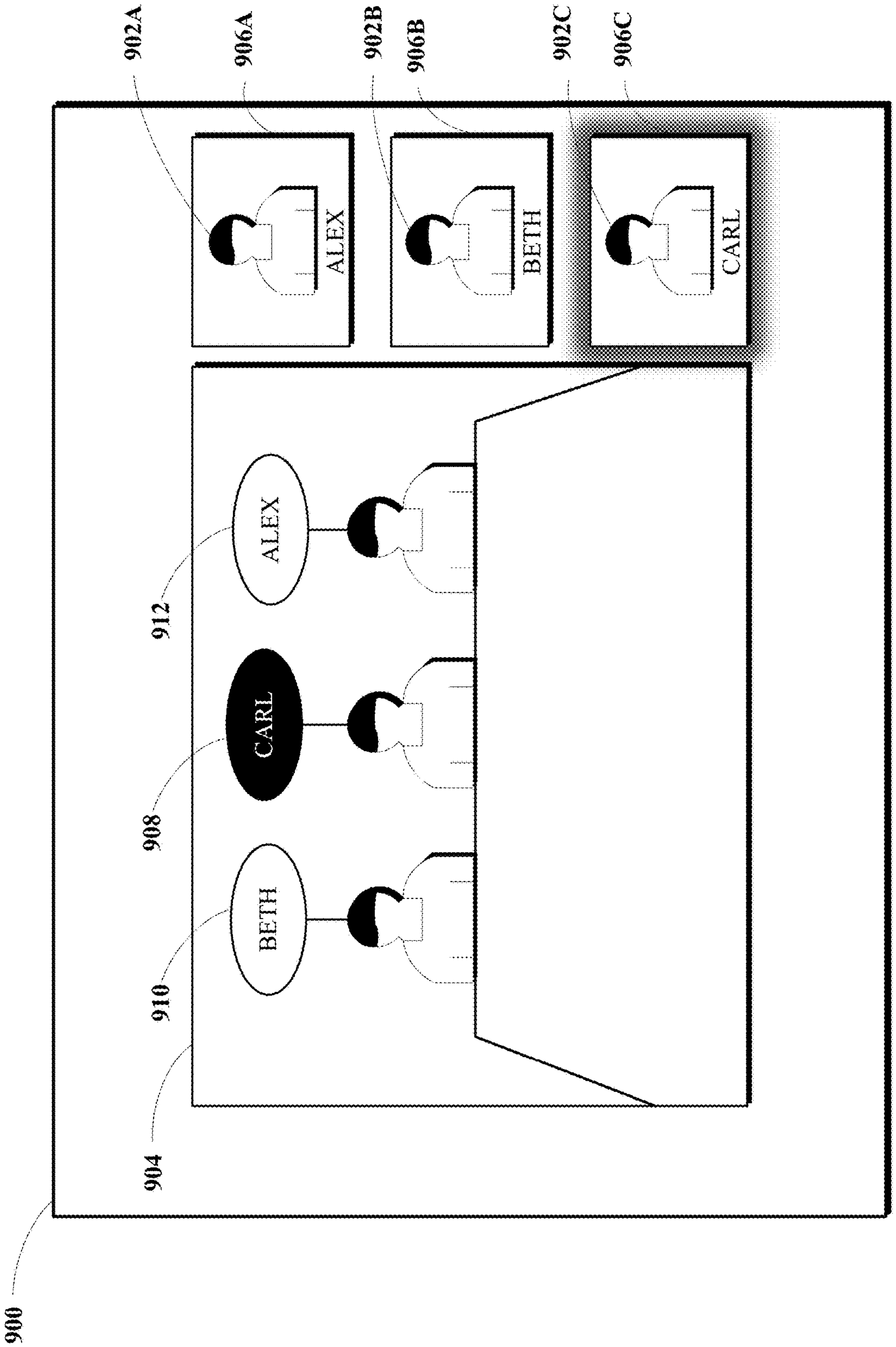

The example GUI 900 of FIG. 9 is similar to the GUI 700 of FIG. 7 and the GUI 800 of FIG. 8 in that it includes the three local conference participants Alex 902A, Beth 902B, and Carl 902C (collectively referred to as local conference participants 902), a group tile 904, and three user tiles 906A-906C. In contrast to the GUIs 700, 800 of FIGS. 7 and 8, the GUI 900 of FIG. 9 presents a representation of the identity of the conference participant who is speaking using a darkened callout 908 in addition to highlighting the user tile associated with the speaking conference participant. For example, in FIG. 9, Carl 902C is now speaking instead of Beth 902B as previously shown in FIG. 8. The user tile 906B associated with Beth 902B is no longer highlighted as previously shown in FIG. 8 and the user tile 906C associated with Carl 902C is now highlighted. In addition, the callout 908 is formatted differently than a call out 910 for Beth 902B and a call out 912 for Alex 902A with the background having a dark appearance and the text being white. Additionally, in this example, the conference participants 902 are each identified in the group tile 904 based on the conference controller recognizing the identity of the conference participants 902 as described previously. Furthermore, in this example Carl 902C and Alex 902A have switched places, but the conference controller recognized that Carl 902C is now seated in the middle seat and is the conference participant speaking. Thus, a remote participant interacting with the GUI 900 is able to determine that Carl 902C is the conference participant who is currently speaking.

Figure 10:
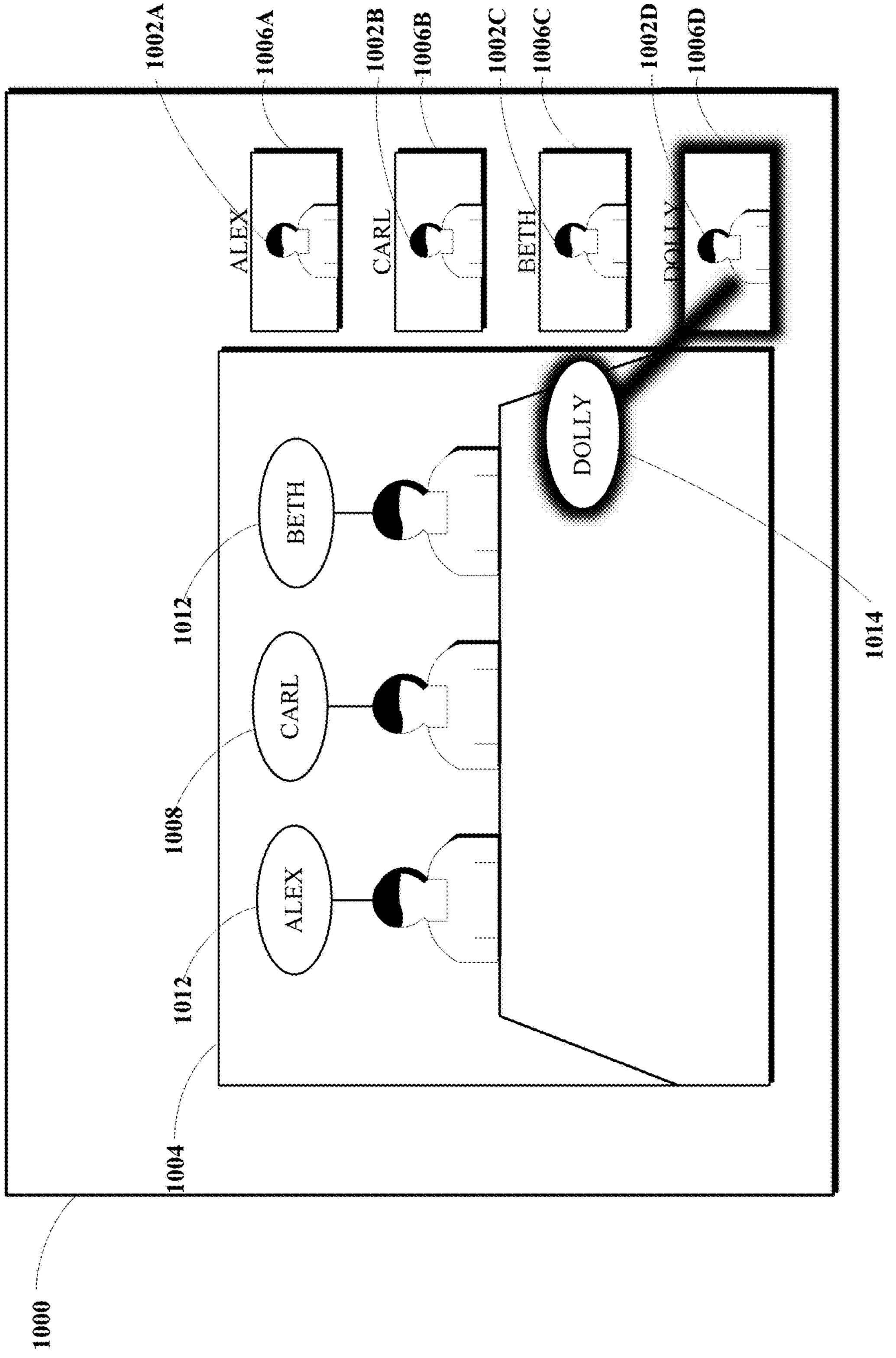

The example GUI 1000 of FIG. 10 is similar to the preceding GUIs in that it includes the three local conference participants Alex 1002A, Beth 1002B, and Carl 1002C (collectively referred to as local conference participants 1002), a group tile 1004, and three user tiles 1006A- 1006C. In contrast to the preceding GUIs, the GUI 1000 of FIG. 10 includes an additional local conference participant, Dolly 1002D that is not in view of the video camera responsible for generating the image of the group tile 1004. Because Dolly 1002D is not present in the group view of the group tile 1004, the user tile 1006D associated with Dolly 1002D can display a past image of Dolly 1002D, such as an image taken at the time she checked into the conference or an image associated with her user profile.

In the example GUI 1000 of FIG. 10, Dolly 1002D is now speaking although she is not shown in the group tile 1004. In a typical video conference, unless the remote participant knows Dolly's voice, they would not know who is speaking. The example GUI 1000 of FIG. 10 overcomes this limitation by providing a representation of the identity of the conference participant who is speaking by highlighting the user tile 1006D associated with Dolly 1002D and providing a highlighted call out 1014 that includes Dolly's name. Thus, a remote participant interacting with the GUI 1000 is able to determine that Dolly 1002D is the conference participant who is currently speaking despite Dolly 1002D not being in the group tile 1004.

Figure 11:
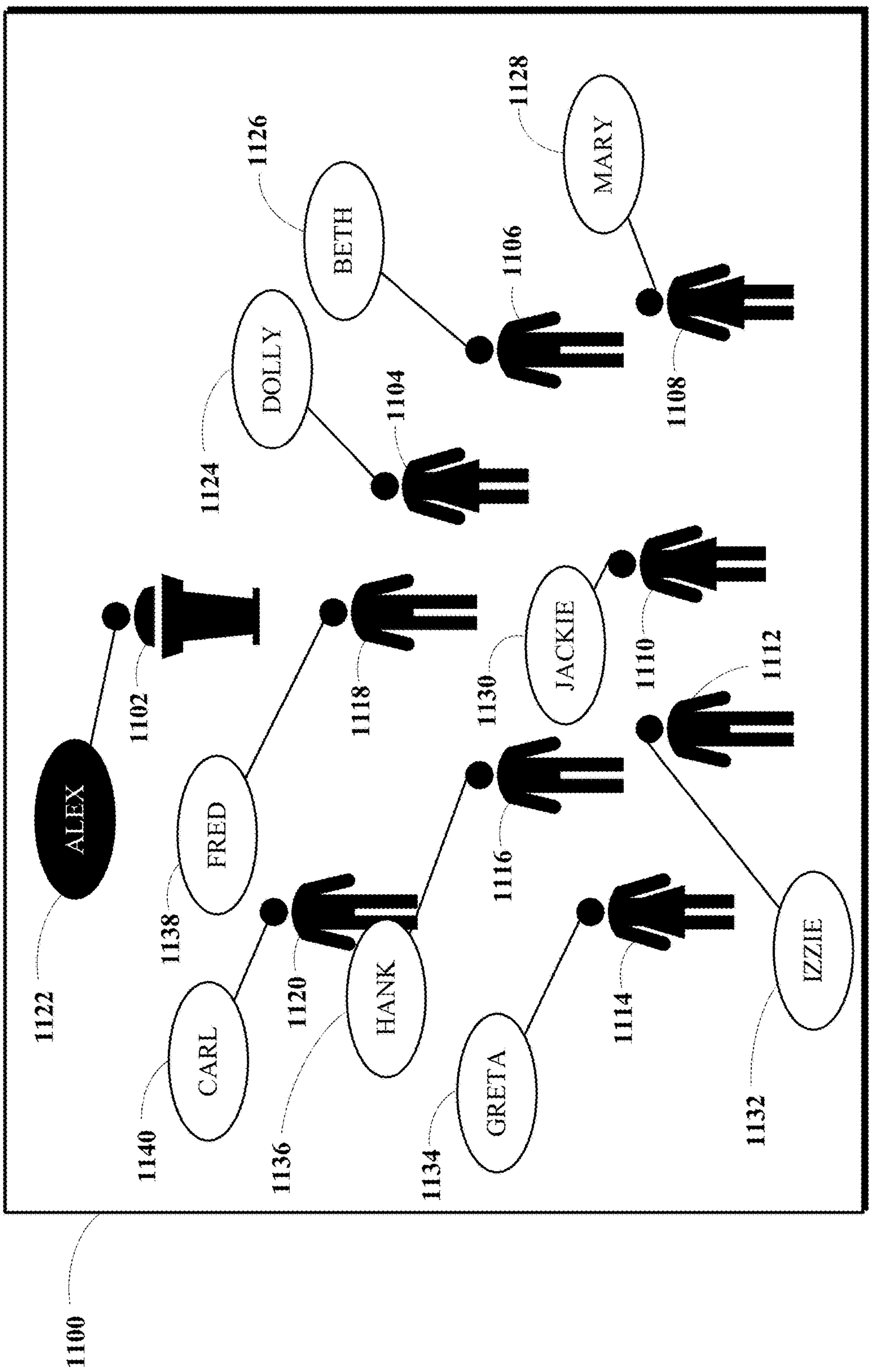

FIG. 11 illustrates an example GUI 1100 for use with a conference system for determining the identity of a speaking conference participant. FIG. 11 differs from the preceding examples in that the example GUI 1100 does not include any tiles and instead displays a group view of a physical space with ten conference participants 1102-1120. The example GUI 1100 may be suitable for implementations in which there are a large number of local conference participants. In this example, each conference participant has an associated call out 1122-1140 that includes a text representation of the identity of each respective conference participant. The call out 1122 for the speaking conference participant 1102 is differentiated from the call outs for the other conference participants by use of a dark background and white text. In this example, Alex 1102A is speaking and his call out 1122 identifies him as the speaker through the different formatting of his call out 1122. A remote participant interacting with the GUI 1100 is able to easily identify Alex 1102A as the currently speaking participant based on his call out 1122. The remote participant may recognize Alex 1102A as the speaker even if the remote participant does not recognize the voice of Alex 1102A and/or Alex's face is obscured from view in the group view.

Figure 12:
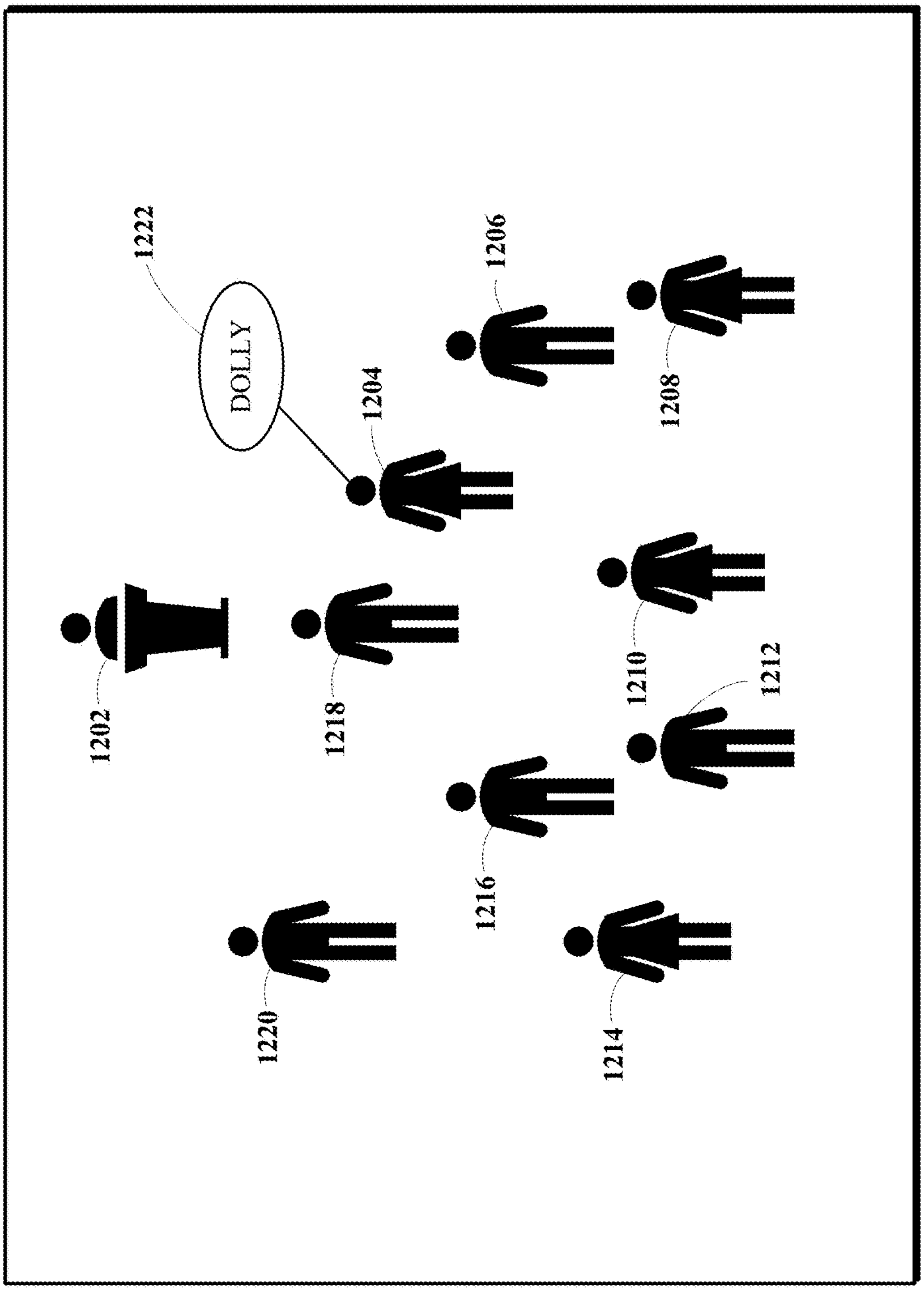

FIG. 12 illustrates an example GUI 1200 for use with a conference system for determining the identity of a speaking conference participant. FIG. 12 differs from the preceding examples of FIG. 11 in that the example GUI 1200 does not include a call out for every conference participant. Instead, the GUI 1200 presents the representation of the identity of the speaking conference participant using a single call out 1222. In this example, Dolly 1204D is currently speaking and the call out 1222 identifies her as Dolly 1204D and indicates that she is currently speaking. A remote participant interacting with the GUI 1200 is able to easily identify Dolly 1204D as the currently speaking conference participant based on her call out 1222. The remote participant may do so even if the remote participant does not recognize the voice of Dolly 1204D and/or Dolly's face is obscured in the group view.

Figure 13:
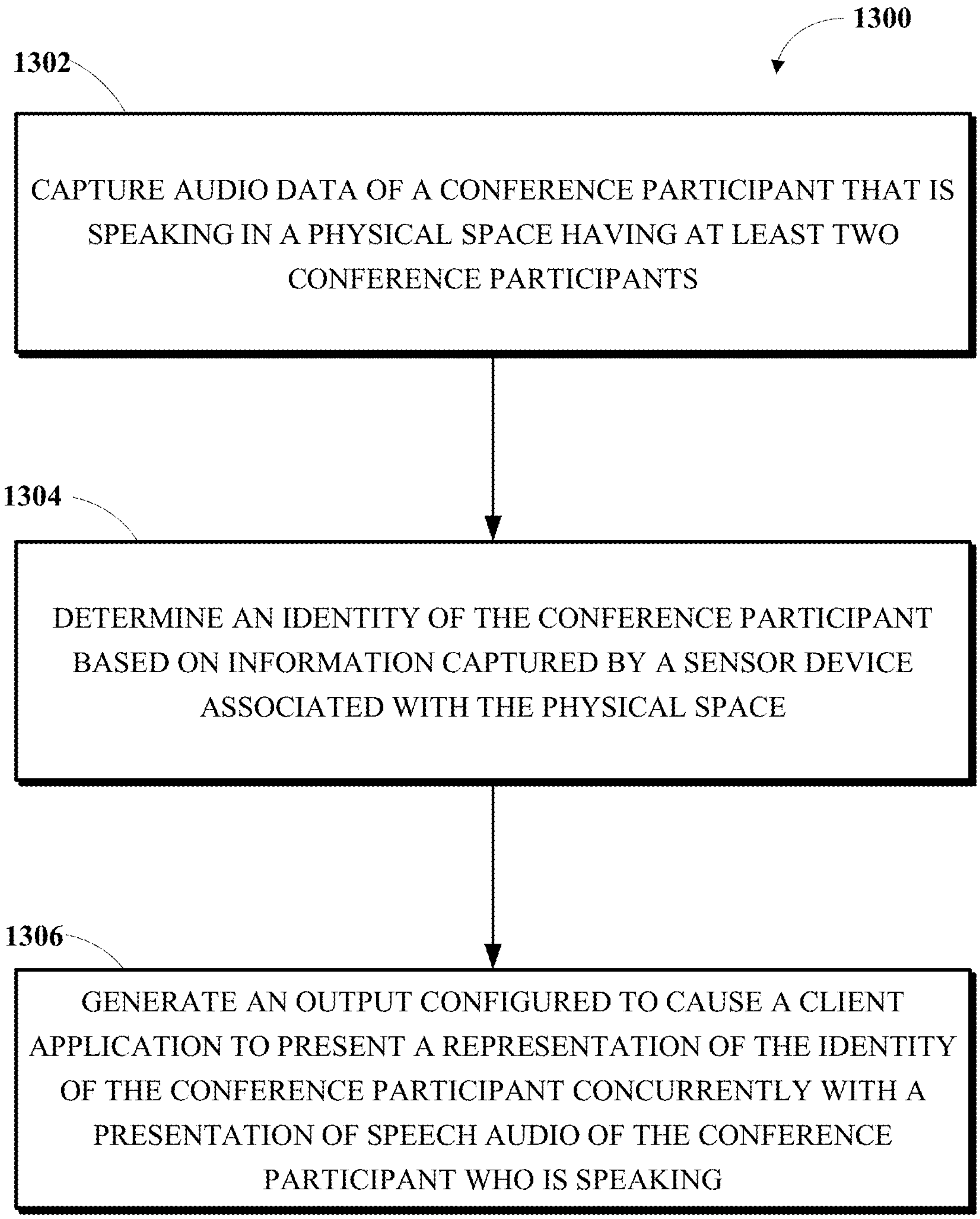
FIG. 13 is a block diagram of an example of a technique for identifying a local conference participant who is speaking in a user interface of a remote conference participant.

To further describe some implementations in greater detail, reference is next made to examples of techniques which may be performed by or using a conference controller. FIG. 13 is a flowchart of an example of a technique 1300 for identifying a speaking conference participant in a physical space. The technique 1300 can be executed using computing devices, such as the systems, hardware, and software described with respect to FIGS. 1-12. The technique 1300 can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, the technique 1300 includes capturing audio data of a conference participant who is speaking in a physical space having at least two conference participants. Capturing audio data is implemented using at least one audio sensing device such as a microphone. In some instances, there may be multiple microphones in the physical space. In some instances, the microphones may capture audio data at other times in addition to the time the conference participant is speaking.

Referring to FIG. 5, in one example, the microphone 510 captures audio data of at least two conference participants in the physical space 500. The audio data is transmitted to the conference controller 506 for further processing. The microphone 510 can capture audio data continuously during a conference, or it may be activated selectively. For instance, the microphone 510 may be muted when conference participants are not speaking and then capture audio data when the conference participants begin to speak.

At 1304, the technique 1300 includes determining an identity of the conference participant based on information captured by a sensor device associated with the physical space. The sensor device can be any sensor device in the physical space suitable for capturing information that can be used to identify the conference participant who is speaking. In some instances, multiple sensor devices may be used to assist in determining the identity of the conference participant who is speaking. For instance, a microphone may capture audio and a video sensor may capture video. Voice recognition may be used to identify the conference participant based on the captured audio and facial recognition may be used to verify the identity the conference participant based on data from the video sensor.

Referring to FIG. 5, in one example, the microphone 510 may be used to identify the conference participant who is speaking. For instance, the audio data may be compared to a voice sample of the conference participants to identify which conference participant is speaking. Additionally, image information captured by the video camera 508 may be used to verify which conference participant is speaking and facial recognition based on the image information may be used to confirm the identity of the conference participant.

At 1306, the technique 1300 includes generating an output configured to cause a client application to present a representation of the identity of the conference participant who is speaking concurrently with the presentation of the speech audio of that conference participant. The output may be a multimedia stream containing audio data and video data. The multimedia stream can be encoded with metadata indicating the identity of the conference participant who is speaking. A remote client device receives the multimedia stream and presents a representation of the identity of the conference participant concurrently with outputting audio of the conference participant speaking. In some implementations, the multimedia stream can be encoded to include the representation of the conference participant who is speaking. For example, text identifying the speaking participant can be encoded into the multimedia stream to identify the speaking conference participant.

Referring to the example of FIG. 5, the conference controller 506 can encode the audio data for output at the remote client devices. The conference controller can further send data indicating the identity of the conference participant who is speaking and include time information indicated the start and stop time that the conference participant is speaking. The encoded audio stream and the data indicating the identity of the conference participant can cause the remote client devices to play back the audio data and present a representation of the identity of the speaking conference participant.

The implementations of this disclosure correspond to methods, non-transitory computer readable media, apparatuses, systems, devices, and the like. In some implementations, a method comprises capturing audio data of a conference participant who is speaking in a physical space having at least two conference participants, determining an identity of the conference participant based on sensor data captured by a sensor device associated with the physical space, and generating an output configured to cause a client application to present a representation of the identity of the conference participant who is speaking concurrently with a presentation of speech audio of the conference participant who is speaking. In some implementations, an apparatus comprises an audio sensor, a memory, and a processor configured to execute instructions stored in the memory to capture audio data of a conference participant who is speaking in a physical space having at least two conference participants, determine an identity of the conference participant based on sensor data captured by a sensor device associated with the physical space; and generate an output configured to cause a client application to present a representation of the identity of the conference participant who is speaking concurrently with a presentation of speech audio of the conference participant who is speaking. In some implementations, a non-transitory computer readable medium stores instructions operable to cause one or more processors to perform operations comprising capturing audio data of a conference participant who is speaking in a physical space having at least two conference participants, determining an identity of the conference participant based on sensor data captured by a sensor device associated with the physical space, and generating an output configured to cause a client application to present a representation of the identity of the conference participant who is speaking concurrently with a presentation of speech audio of the conference participant who is speaking.

In some implementations of the method, non-transitory computer readable medium, or apparatus, the sensor device comprises an audio sensor configured to capture the audio data and the sensor data captured by the audio sensor comprises the audio data.

In some implementations of the method, non-transitory computer readable medium, or apparatus, the sensor device comprises an image sensor, the sensor data captured by a sensor device comprises image data, and the identity of the conference participant is determined using facial recognition.

In some implementations of the method, non-transitory computer readable medium, or apparatus, the method comprises, the operations comprise, or the processor is configured to execute the instructions for obtaining identifying information, wherein determining the identity of the conference participant is based in part on a comparison of the identifying information and the information captured by the sensor device associated with the physical space.

In some implementations of the method, non-transitory computer readable medium, or apparatus, the method comprises, the operations comprise, or the processor is configured to execute the instructions for obtaining identifying information for each conference participant responsive to the at least two conference participants checking into a conference, wherein determining the identity of the conference participant is based in part on a comparison of the identifying information and the information captured by a sensor device associated with the physical space.

In some implementations of the method, non-transitory computer readable medium, or apparatus, the representation of the identity of the conference participant is displayed at a tile of the client application.

In some implementations of the method, non-transitory computer readable medium, or apparatus, client application presents a tile for each of the at least two conference participants and the representation of the identity of the conference participant who is speaking is displayed at a tile associated with the conference participant who is speaking.

In some implementations of the method, non-transitory computer readable medium, or apparatus, the representation of the identity of the conference participant is displayed at a tile displaying a video feed of the conference participant.

In some implementations of the method, non-transitory computer readable medium, or apparatus, the method comprises, the operations comprise, or the processor is configured to passing the identity of the conference participant to an audio to text generation service to distinguish between names and other words.

In some implementations of the method, non-transitory computer readable medium, or apparatus, the representation of the identity of the conference participant is an alias.

In some implementations of the method, non-transitory computer readable medium, or apparatus, the method comprises, the operations comprise, or the processor is configured to obtain identifying information for the at least two conference participants, wherein determining the identity of the conference participant is based in part on a comparison of the identifying information and the information captured by the sensor device associated with the physical space.

In some implementations of the method, non-transitory computer readable medium, or apparatus, the audio sensor provides captured the sensor data to determine the identity of the conference participant.

In some implementations of the method, non-transitory computer readable medium, or apparatus, the method comprises, the operations comprise, or the processor is configured to execute the instructions for combine sensor data from at least two sensors to determine the identity of the conference participant.

In some implementations of the method, non-transitory computer readable medium, or apparatus, the method comprises, the operations comprise, or the processor is configured to execute the instructions for prompting the at least two conference participants to provide identifying information.

In some implementations of the method, non-transitory computer readable medium, or apparatus, the method comprises, the operations comprise, or the processor is configured to execute the instructions for determining a source location of the audio data.

In some implementations of the method, non-transitory computer readable medium, or apparatus, the method comprises, the operations comprise, or the processor is configured to execute the instructions for generating metadata for the output to identify a time span to present the representation of the identity of the conference participant at the client application.

In some implementations of the method, non-transitory computer readable medium, or apparatus, the method comprises, the operations comprise, or the processor is configured to execute the instructions for comparing the captured audio data to sample audio data to determine the identity of the conference participant.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, lookup tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

determining, by a conferencing system used for a video conference, identities of multiple local conference participants by comparing, for each local conference participant of the multiple local conference participants, sensor data captured during the video conference with identifying information captured, upon the local conference participant checking in for the video conference, by a card reader of a physical space and one or more of a camera or a microphone of the physical space;

outputting, by the conferencing system, first data to cause a client application to present, within a portion of a graphical user interface of the video conference, a video depicting the multiple local conference participants within the physical space;

outputting, by the conferencing system, second data to cause the client application to present, within the video, text representations of the identities of the multiple local conference participants;

outputting, by the conferencing system, third data to cause the client application to highlight, within the video and while the text representations of the identities of the multiple local conference participants are presented within the video, the text representation of the identity of a first local conference participant of the multiple local conference participants based on speech audio of the first local conference participant, wherein highlighting the text representation of the identity of the first local conference participant visually distinguishes the text representation of the identity of the first local conference participant from text representations of identities of other local conference participants of the multiple local conference participants within the video; and purging, by the conferencing system, from a local data store, after the video conference, the identifying information captured for each local conference participant upon the local conference participant checking in for the video conference.

2. The method of claim 1, wherein at least some of the identities of the multiple local conference participants are determined using voice recognition.

3. The method of claim 1, wherein at least some of the identities of the multiple local conference participants are determined using facial recognition.

4. The method of claim 1, further comprising:

verifying, based on a difference in audio level captured by two or more microphones, that the speech audio corresponds to the first local conference participant.

5. The method of claim 1, further comprising:

obtaining a portion of the identifying information for each local conference participant using a fingerprint reader of the physical space.

6. The method of claim 1, wherein the text representations of the identities of the multiple local conference participants include names of the multiple local conference participants.

7. The method of claim 1, wherein the portion of the graphical user interface is a tile associated with the physical space.

8. The method of claim 1, wherein the text representations of the identities of the multiple local conference participants include images of the multiple local conference participants.

9. The method of claim 1, further comprising:

passing the identities of the multiple local conference participants to an audio to text generation service to distinguish between names and other words.

10. The method of claim 1, wherein the text representation of an identity of at least one local conference participant of the multiple local conference participants includes an alias of the at least one local conference participant.

11. An apparatus, comprising:

a memory; and a processor configured to execute instructions stored in the memory to:

determine identities of multiple local conference participants by comparing, for each local conference participant of the multiple local conference participants, sensor data captured during a video conference with identifying information captured, upon the local conference participant checking in for the video conference, by a card reader of a physical space and one or more of a camera or a microphone of the physical space;

output first data to cause a client application to present, within a portion of a graphical user interface of the video conference, a video depicting the multiple local conference participants within the physical space;

output second data to cause the client application to present, within the video, text representations of the identities of the multiple local conference participants;

output third data to cause the client application to highlight, within the video and while the text representations of the identities of the multiple local conference participants are presented within the video, the text representation of the identity of a first local conference participant of the multiple local conference participants based on speech audio of the first local conference participant, wherein highlighting the text representation of the identity of the first local conference participant visually distinguishes the text representation of the identity of the first local conference participant from text representations of identities of other local conference participants of the multiple local conference participants within the video; and purge, from a local data store, after the video conference, the identifying information captured for each local conference participant upon the local conference participant checking in for the video conference.

12. The apparatus of claim 11, wherein the processor is further configured to execute the instructions to:

verify, based on a difference in audio level captured by two or more microphones, that the speech audio corresponds to the first local conference participant.

13. The apparatus of claim 11, wherein the processor is further configured to execute the instructions to:

perform one or both of voice recognition or facial recognition to determine the identity of at least one local conference participant of the multiple local conference participants.

14. The apparatus of claim 11, wherein the processor is further configured to execute the instructions to:

combine sensor data from at least two sensors to determine the identity of the local conference participant, wherein the at least two sensors include the card reader and the at least one of the camera or the microphone.

15. The apparatus of claim 11, wherein the processor is further configured to execute the instructions to:

prompt the multiple local conference participants to provide other identifying information to determine the identities of the multiple local conference participants.

16. A non-transitory computer-readable medium storing instructions operable to cause one or more processors to perform operations comprising:

determining, by a conferencing system used for a video conference, identities of multiple local conference participants by comparing, for each local conference participant of the multiple local conference participants, sensor data captured during the video conference with identifying information captured, upon the local conference participant checking in for the video conference, by a card reader of a physical space and one or more of a camera or a microphone of the physical space;

outputting, by the conferencing system, first data to cause a client application to present, within a portion of a graphical user interface of the video conference, a video depicting the multiple local conference participants within the physical space;

outputting, by the conferencing system, second data to cause the client application to present, within the video, text representations of the identities of the multiple local conference participants;

outputting, by the conferencing system, third data to cause the client application to highlight, within the video and while the text representations of the identities of the multiple local conference participants are presented within the video, the text representation of the identity of a first local conference participant of the multiple local conference participants based on speech audio of the first local conference participant, wherein highlighting the text representation of the identity of the first local conference participant visually distinguishes the text representation of the identity of the first local conference participant from text representations of identities of other local conference participants of the multiple local conference participants within the video; and purging, by the conferencing system, from a local data store, after the video conference, the identifying information captured for each local conference participant upon the local conference participant checking in for the video conference.

17. The non-transitory computer-readable medium of claim 16, the operations comprising:

determining a source location of audio data, wherein the audio data is used to determine the identities of at least some of the multiple local conference participants.

18. The non-transitory computer-readable medium of claim 16, the operations comprising:

generating metadata for identifying a time span during which to present the text representations of the identities of the multiple local conference participants.

19. The non-transitory computer-readable medium of claim 16, the operations comprising:

comparing captured audio data to sample audio data to determine the identity of a local conference participant of the multiple local conference participants.

20. The non-transitory computer-readable medium of claim 16, wherein the highlighting of the text representation of the identity of the first local conference participant is to a callout depicted within the video and within which the text representation of the identity of the first local conference participant is visually presented.

* * * * *